United States Patent
Soule

(10) Patent No.: US 9,186,006 B2
(45) Date of Patent: Nov. 17, 2015

(54) PORTABLE LIQUID WARMER

(71) Applicant: Maverick Industries, Inc., Edison, NJ (US)

(72) Inventor: Randall Soule, Reno, NV (US)

(73) Assignee: Maverick Industries, Inc., Edison, NJ (US)

( * ) Notice: Subject to any disclaimer, the term of this patent is extended or adjusted under 35 U.S.C. 154(b) by 273 days.

(21) Appl. No.: 13/947,279

(22) Filed: Jul. 22, 2013

(65) Prior Publication Data

US 2013/0306617 A1    Nov. 21, 2013

Related U.S. Application Data

(63) Continuation-in-part of application No. 13/317,724, filed on Oct. 25, 2011, now abandoned.

(51) Int. Cl.
| | | |
|---|---|---|
| H05B 3/68 | (2006.01) | |
| F27D 11/00 | (2006.01) | |
| A47G 19/22 | (2006.01) | |
| A47J 36/24 | (2006.01) | |

(52) U.S. Cl.
CPC ......... *A47G 19/2288* (2013.01); *A47J 36/2461* (2013.01)

(58) Field of Classification Search
CPC ............. A47G 19/2288; A47J 36/2461; A47J 36/2411; A47J 36/2433; A47J 36/2444; A47J 27/002–27/004; A47J 27/082
USPC .................................. 219/429–442
See application file for complete search history.

(56) References Cited

U.S. PATENT DOCUMENTS

| | | | |
|---|---|---|---|
| 1,414,494 A | 5/1922 | Amtfield | |
| 2,516,637 A | 7/1950 | McCollum | |
| 4,095,090 A | 6/1978 | Pianezza | |
| 4,215,267 A * | 7/1980 | Kaebitzsch | ................... 219/439 |
| 4,463,664 A | 8/1984 | Peace | |
| 4,801,782 A | 1/1989 | Ineson | |
| 5,208,896 A | 5/1993 | Katayev | |
| 5,283,420 A | 2/1994 | Montalto | |
| 5,508,494 A | 4/1996 | Sarris et al. | |
| 6,037,570 A | 3/2000 | Noles | |
| 6,072,161 A | 6/2000 | Stein | |
| 6,075,229 A | 6/2000 | Vanselow | |
| 6,121,585 A | 9/2000 | Dam | |
| 6,140,614 A | 10/2000 | Padamsee | |
| 6,192,787 B1 | 2/2001 | Montalto | |
| 6,403,928 B1 | 6/2002 | Ford | |
| 6,674,052 B1 | 1/2004 | Luo | |
| 6,703,590 B1 | 3/2004 | Holley, Jr. | |
| 6,840,159 B1 * | 1/2005 | Li | ................................. 99/337 |
| 6,852,954 B1 | 2/2005 | Liu et al. | |

(Continued)

*Primary Examiner* — Sang Y Paik
(74) *Attorney, Agent, or Firm* — Doherty IP Law Group LLC

(57) ABSTRACT

An apparatus for warming consumable liquids and for controllably maintaining the elevated temperature of the liquid that includes a housing having an upper portion, a tapered lower portion and a side wall defining a tapered receiving chamber for receiving the container containing the consumable liquid. Disposed within the housing in close proximity to the tapered receiving chamber is an electric heater for heating the receiving chamber. Operably associated with the electric heater is a controller that includes an electrical circuit for energizing the electric heater and for controllably maintaining the electric heater at a selected one of a plurality of elevated temperatures.

19 Claims, 9 Drawing Sheets

(56) References Cited

U.S. PATENT DOCUMENTS

| | | |
|---|---|---|
| 6,864,462 B2 | 3/2005 | Sanoner et al. |
| 6,870,135 B2 | 3/2005 | Hamm et al. |
| 6,964,224 B2 * | 11/2005 | Minamigawa .................. 99/403 |
| 7,022,946 B2 | 4/2006 | Sanoner et al. |
| 8,274,016 B2 | 9/2012 | Montana |
| 2002/0023912 A1 | 2/2002 | McGee et al. |
| 2002/0175158 A1 * | 11/2002 | Sanoner et al. ............... 219/387 |
| 2004/0140304 A1 | 7/2004 | Leyendecker |
| 2005/0016985 A1 * | 1/2005 | Haas et al. .................... 219/438 |
| 2006/0186297 A1 | 8/2006 | Lore, Sr. |

* cited by examiner

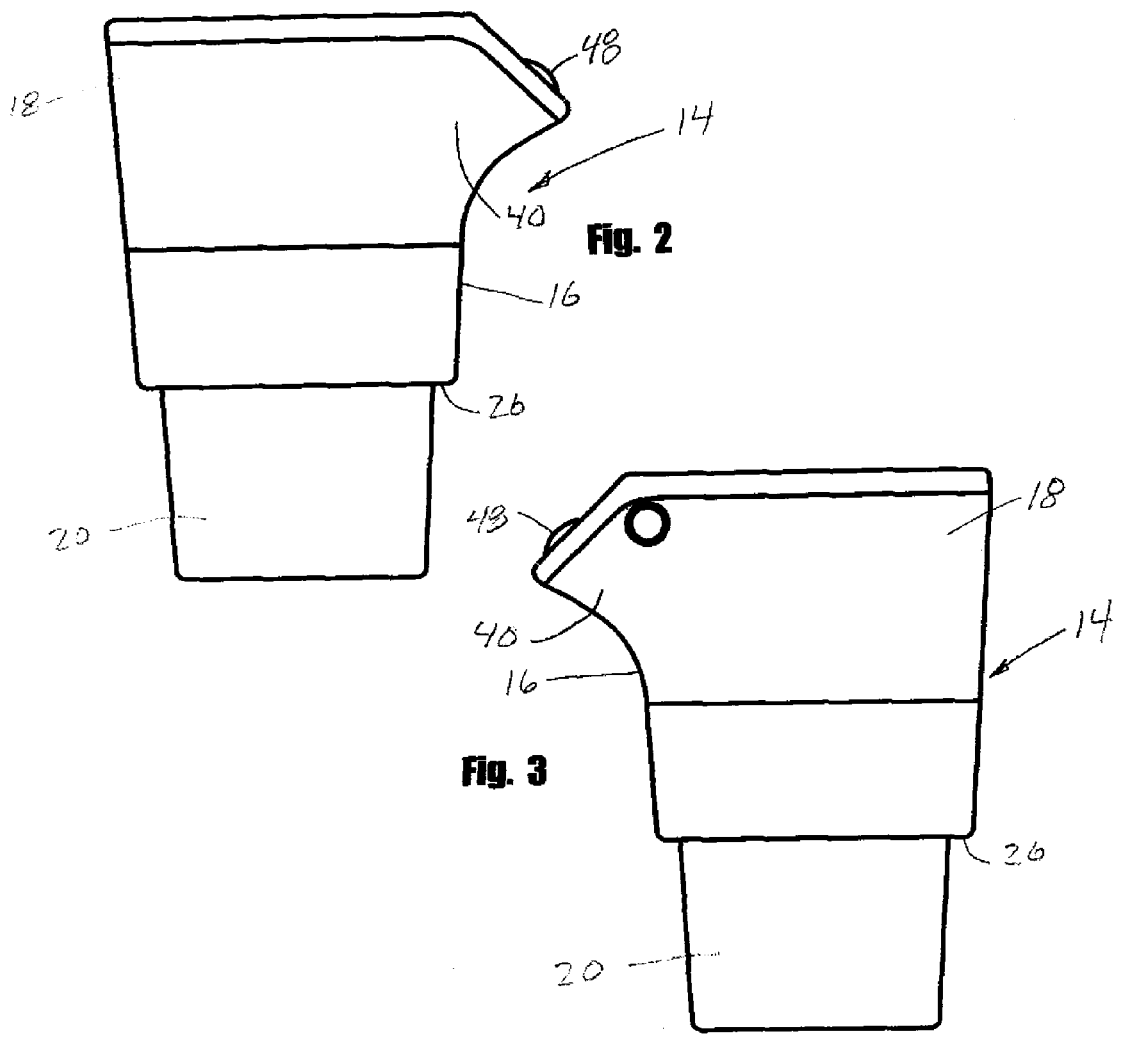

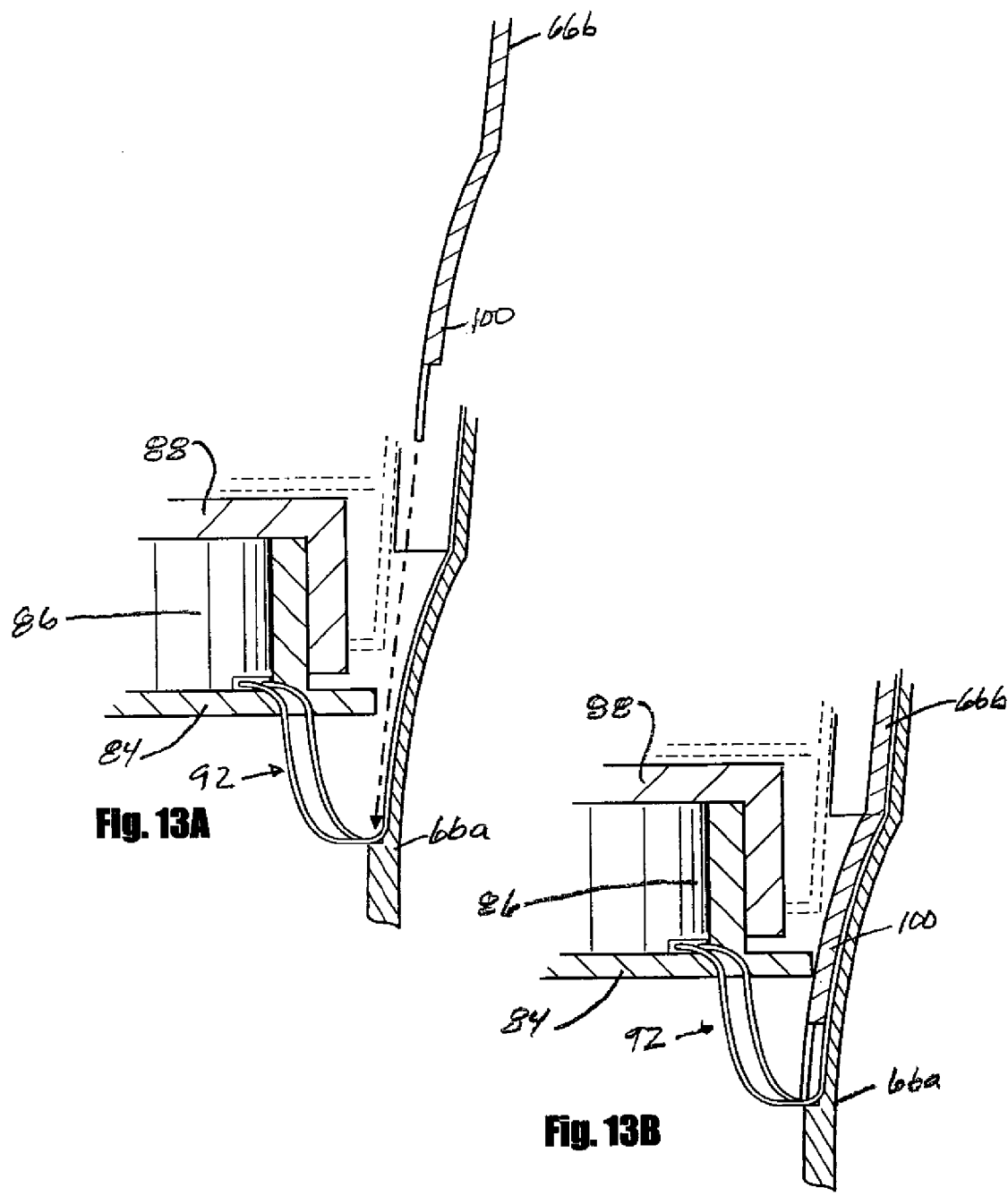

PORTABLE LIQUID WARMER

CROSS-REFERENCE TO RELATED APPLICATIONS

This is a Continuation-In-Part Application of co-pending U.S. application Ser. No. 13/317,724 filed Oct. 25, 2011.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to warmers for warming consumable liquids, such as coffee, and for controllably maintaining the elevated temperature of the liquid. More particularly, the invention concerns a warmer for warming consumable liquids and for maintaining the temperature of the liquid at one of three temperatures selected by the user.

2. Description of Related Art Including Information Disclosed Under 37 CFR 1.97 and 1.98

Beverages such as coffee, tea and the like are best enjoyed when consumed hot. When such beverages are served in a conventional drinking cup they tend to cool relatively rapidly. This is particularly true when the beverage is served in a paper drinking cup of the character used in many drive-through restaurants.

Devices of several different designs have been suggested in the past for warming consumable liquids and for maintaining the elevated temperature of the liquid. Exemplary of one such device is that described in U.S. Pat. No. 6,121,585 to Dam. The invention described in the Dam patent comprises a beverage cup and cup holder system. The Dam beverage cup includes a sleeve, a liner and a base that includes a plate, a heating element and a pair of spring terminals. The base further includes a contact ring and a contact disk. The cup holder, which is adapted to mate with the base of the beverage cup, has recessed land areas which lie below a plane of the support for the beverage cup and are electrically isolated from each other. The cup holder includes spring contacts which extend into the recessed land areas and are adapted to receive connections from an external source of electrical current. The beverage cup, when filled with a hot beverage, is placed into the cup holder. As the beverage cup is placed into the cup holder, the contact disk and contact ring automatically align with the recessed land areas and make contact with the spring contacts. The heating element of the device maintains a beverage at a desirable equilibrium temperature for an extended period of time.

Another prior art device past for warming consumable liquids is described in U.S. Pat. No. 4,463,664 issued to Peace. The Peace invention provides a receptacle having a thermally nonconductive exterior to retain the heat of liquids, and a durable heat-conductive interior portion to reside in heat-conductive relation with a source of warming heat, so as to impart heat to the contents of the receptacle. The receptacle of the Peace device comprises a heat-conductive liner including a bottom portion and an upwardly extending wall portion, and a heat-insulating sleeve surrounding the wall portion of the liner, the bottom portion of the liner being exposed for direct contact with a heat source. The nonconductive sleeve surrounding the wall portion of the conductive liner has an open bottom which terminates a short distance below the bottom portion of the liner in surrounding yet spaced-apart relation to the bottom portion, in order to isolate the sleeve from the heat source.

BRIEF SUMMARY OF THE INVENTION

By way of brief summary, one form of the apparatus of the present invention for warming consumable liquids and for controllably maintaining the elevated temperature of the liquid comprises a housing having a tapered upper portion, a tapered lower portion and a side wall defining a tapered receiving chamber for receiving the container containing the consumable liquid. Disposed within the housing in close proximity to the tapered receiving chamber is an electric heater for heating the receiving chamber. Operably associated with the electric heater is a controller that includes an electrical circuit for energizing said electric heater and for controllably maintaining the electric heater at a selected one of a plurality of elevated temperatures.

With the foregoing in mind, it is an object of the present invention to provide an apparatus for warming consumable liquids and for maintaining the elevated temperature of the liquid that uniquely includes a heating mechanism that will maintain the temperature of the liquid at one of three temperatures selected by the user.

Another object of the invention is to provide an apparatus of the aforementioned character which will consistently maintain hot drinks at the desired elevated temperature when a user is traveling in a vehicle or is at any location where there is a 12 VDC or 120 VAC power source.

Another object of the invention is to provide an apparatus of the character described in which the tapered receiving chamber of the device will receive paper take-out containers of virtually every size including coated containers and will effectively hold the container in a stable, readily accessible position.

Another object of the invention is to provide an apparatus of the class described which is designed and sized to allow the user to remove the container from the tapered receiving chamber of the device in order to drink the consumable liquid, or alternatively, to leave the container in the tapered receiving chamber and drink the consumable liquid while holding the device with the container still positioned within the tapered receiving chamber.

Another object of the invention is to provide an apparatus of the character described in the preceding paragraphs which is designed and constructed in a manner that makes it fully compliant with Underwriter Laboratories (UL), ETL Testing Laboratories (now Intertek Testing Services) (ETL) and like nationally recognized testing laboratories approval requirements.

Another object of the invention is to provide an apparatus of the aforementioned character in which, for safety purposes, the controller of the device will de-energize the electric heater after the electric heater reaches a predetermined elevated temperature.

Another object of the invention is provide an apparatus of the character described in which the controller of the device will de-energize said electric heater after the expiration of a predetermined time following the energization of the heater.

Another object of the invention is provide an apparatus of the character described in which the device has three preset temperature settings of low, medium and high and in which the device housing is provided with three small "coffee bean" shaped lights which indicate the temperature setting selected.

Still another object of the invention is to provide an alternate form of the apparatus of the invention for warming a consumable liquid that is contained within a disposable, conventionally configured paper cup and for maintaining the elevated temperature of the liquid contained within the paper cup.

Another object of the invention is to provide an alternate form of the apparatus of the invention as described in the preceding paragraph that is specially designed to permit the apparatus to be easily used with a disposable paper cup about which a heating insulating sleeve has been placed. More particularly, in the design of the alternate form of the apparatus of the invention, a portion of both of the side walls of the unit has been removed to permit the disposable paper cup along with a heat insulating sleeve to be easily inserted into and removed from the tapered receiving chamber of the unit.

Another object of the invention is provide an apparatus of the character described that is attractive in appearance, is inexpensive to manufacture and is easy to use.

The foregoing objectives as well as other features and advantages of the present invention will become readily apparent from the following detailed description and the accompanying drawings.

BRIEF DESCRIPTION OF SEVERAL VIEWS OF THE DRAWINGS

FIG. 2 is a right side view of the apparatus shown in FIG. 1.

FIG. 3 is a left side view of the apparatus shown in FIG. 1.

FIG. 13A is an exploded, fragmentary cross-sectional view similar to FIG. 12 showing in greater detail the mating of the control box cover with the cup housing.

FIG. 13B is a fragmentary cross-sectional view similar to FIG. 13A showing the control box cover mated with the cup housing in a manner to secure the electrical wires of the electrical circuit of the apparatus that lead to the heating element.

DETAILED DESCRIPTION OF THE INVENTION

Figure 1:
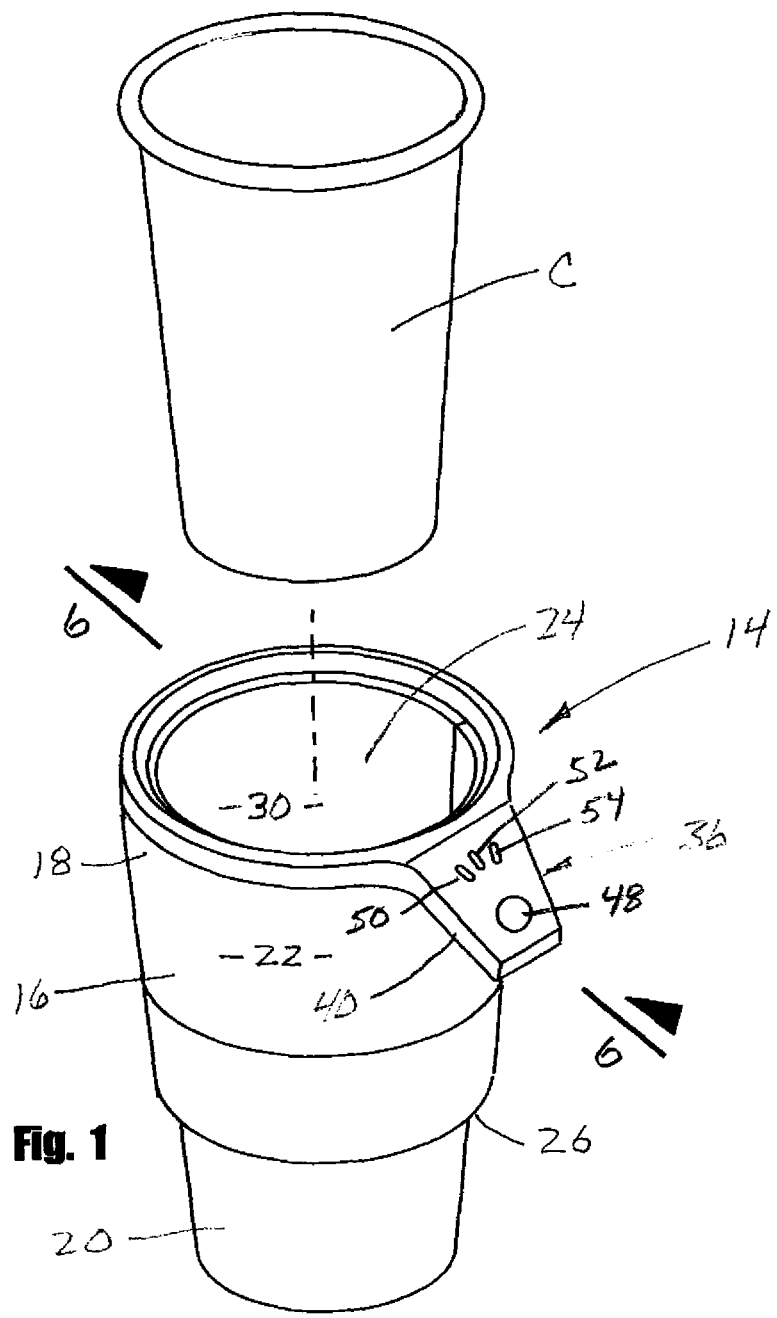
FIG. 1 is a generally perspective, exploded view of one form of the apparatus of the invention for warming consumable liquids and for maintaining the elevated temperature of the liquid.

Referring to the drawings and particularly to FIGS. 1 through 4, one form of the apparatus of the invention for warming consumable liquids and for maintaining the elevated temperature of the liquid is there shown and generally designated by the numeral 14. The apparatus here comprises a housing 16 having an upper portion 18, a tapered lower portion 20, a side wall 22 defining a tapered receiving chamber 24 for receiving the container "C" and a shoulder 26 disposed between upper and lower portions 18 and 20. When the apparatus is in use, shoulder 26 engages a receptacle, such as a vehicle cup holder, so as to hold the apparatus in a stable, upright position. Lower portion 20 includes a generally planar surface 20a that permits the apparatus to rest in a stable fashion on a table, desk top and the like (See FIG. 5).

Figure 4:
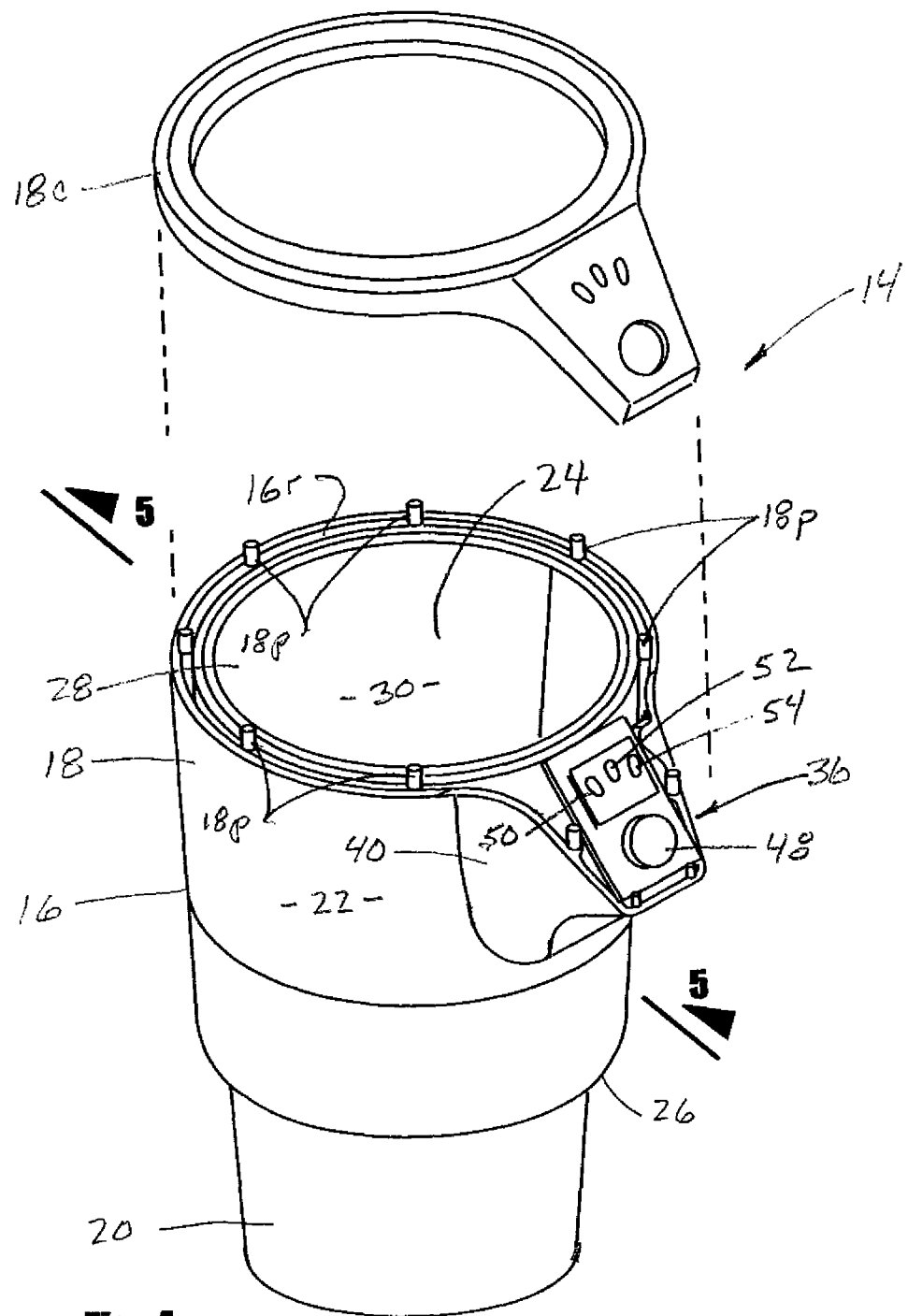
FIG. 4 is a generally perspective, exploded view of the apparatus of the invention illustrating the positioning of the controller assembly of the apparatus on the device housing.

Upper portion 18 includes a cover 18c that is aligned with and affixed to the housing rim 16r by means of a plurality of circumferentially spaced, upwardly extending pins 18p that are closely received within a plurality of apertures (not shown) formed in the cover 18c (See FIG. 4).

Figure 5:
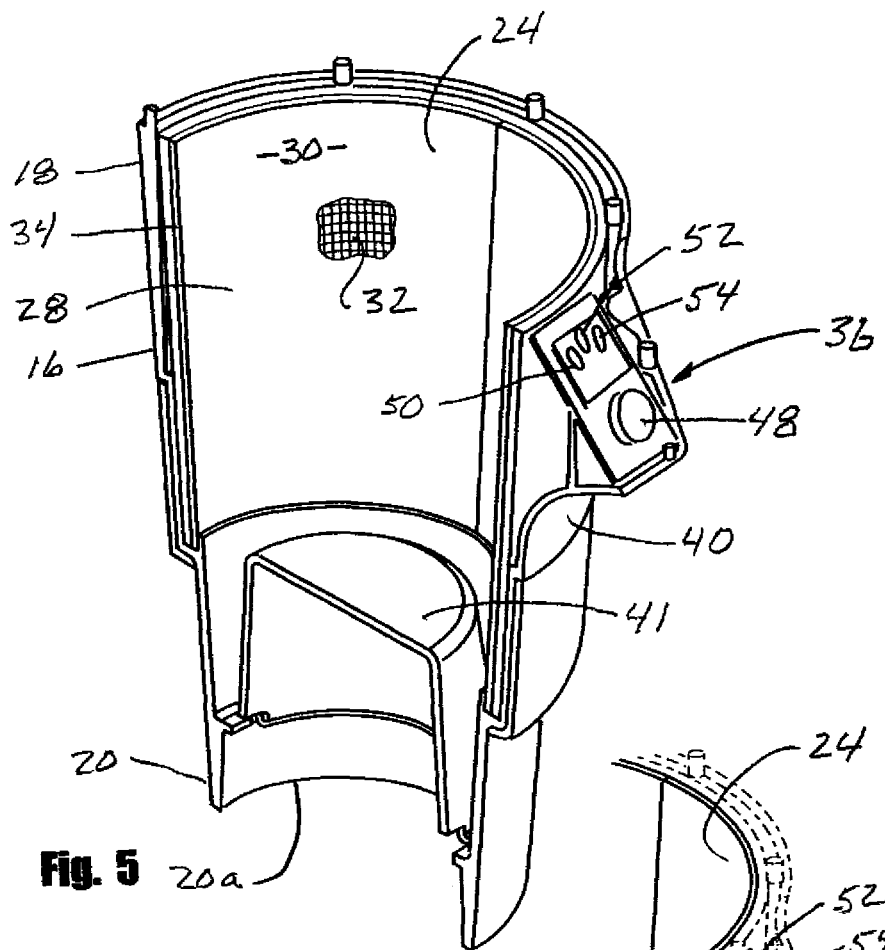
FIG. 5 is a cross-sectional view taken along lines 5-5 of FIG. 4.

Carried by housing 16 for controllably heating receiving chamber 24 is a specially designed electric heater assembly 28, which here comprises a generally conical shaped, flexible resistive heater member 30 that is carried by housing 16 in close proximity to tapered receiving chamber 24. Heater member 30 here comprises a silicone encapsulated wire-wound heating element 32. The silicone rubber encapsulation 34 is very flexible yet provides a water-tight environmental seal. The electric heater comprises a generally conical shaped member carried by said housing and disposed proximate said tapered receiving chamber, said generally conical shaped member having a heating element embedded therewithin. As indicated in FIG. 5 of the drawings, heater assembly 28 includes an insulating member 28a that is affixed to the outer surface of the heater member 30. Insulating member 28a here comprises a sponge rubber insulation that is formed to conform to the outer surface of the heater member.

Figure 5A:
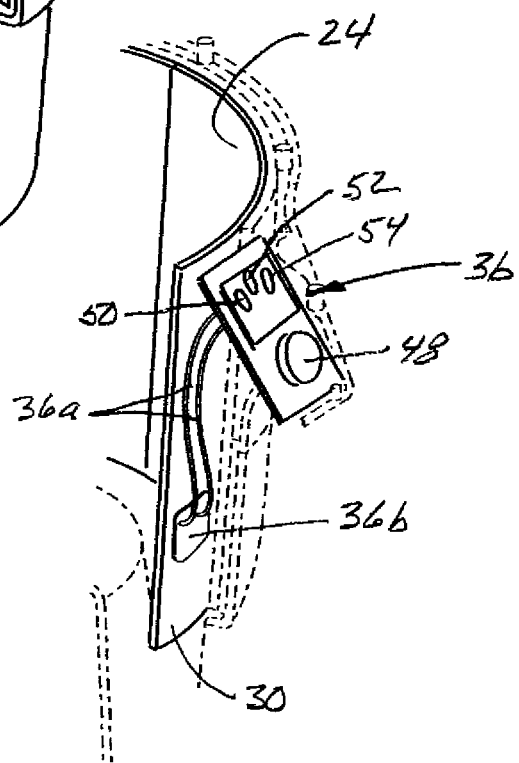
FIG. 5A is a generally perspective, fragmentary view of the apparatus shown in FIG. 5 illustrating the interconnection of the controller with the heating member.

Forming an important feature of the present invention is the controller 36 that is operably associated with the electric heater for energizing the electric heater and for selectively heating the electric heater to a selected elevated temperature and for maintaining the electric heater at the selected temperature. More particularly, controller 36 is interconnected with the electric heater in a conventional manner by means of a pair of connector wires 36a and a connector terminal 36b (FIG. 5A). Controller 36 comprises an electrical circuit 38 (FIG. 7) the character of which will presently be described. As best seen in FIG. 4, the upper portion 18 of housing 16 includes a protuberance 40 upon which the electrical circuit 38 of the controller 36 is mounted. The lower portion 20 of housing 16 includes a generally cup-shaped support 41 for supporting the container "C" that is mounted internally of a chamber 20a formed in the lower portion 20.

Figures 6, 7:
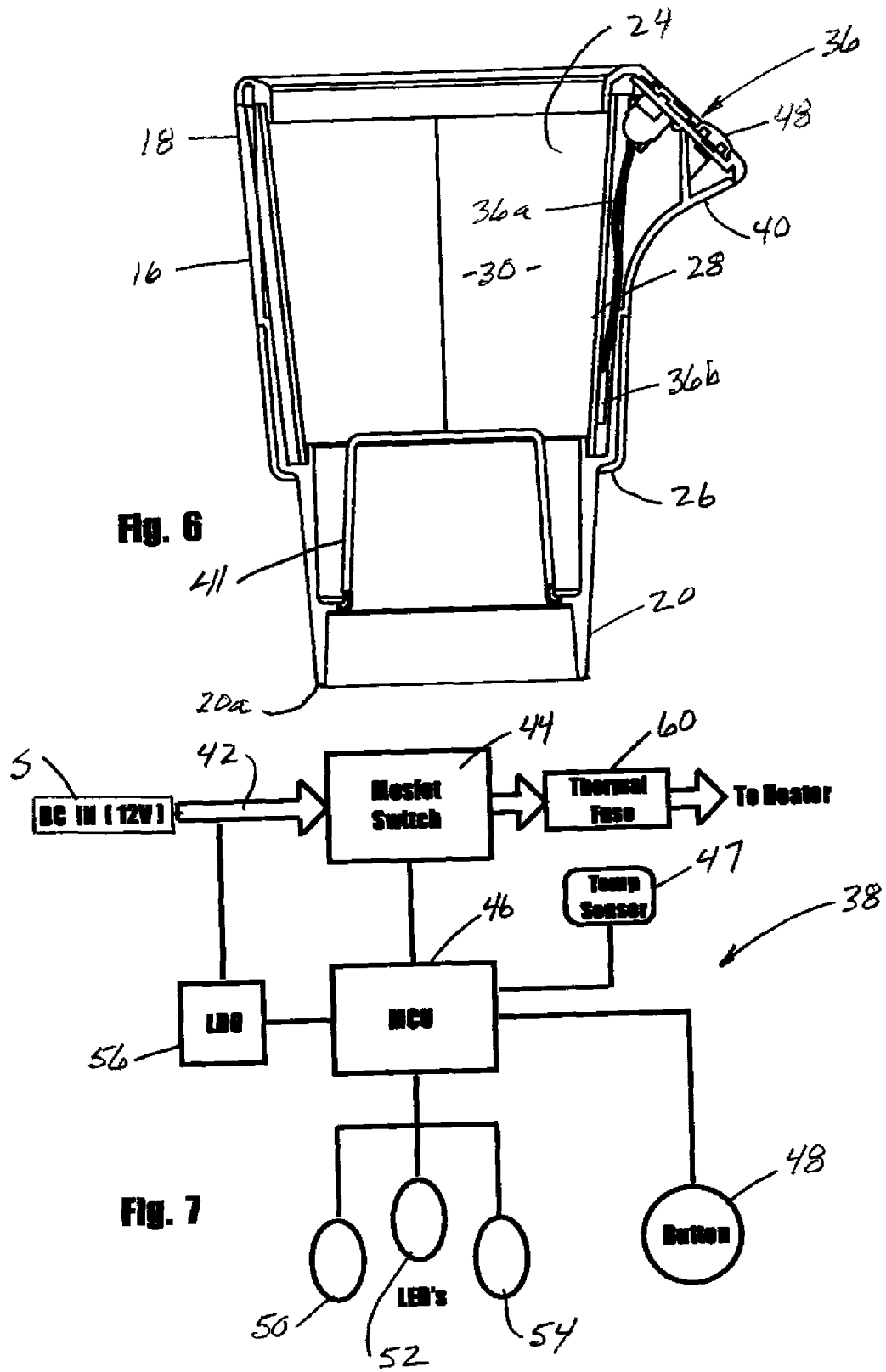
FIG. 6 is a cross-sectional view taken along lines 6-6 of FIG. 1.
FIG. 7 is a block diagram of the electrical circuitry of one form of the apparatus of the invention.
Figure 8:
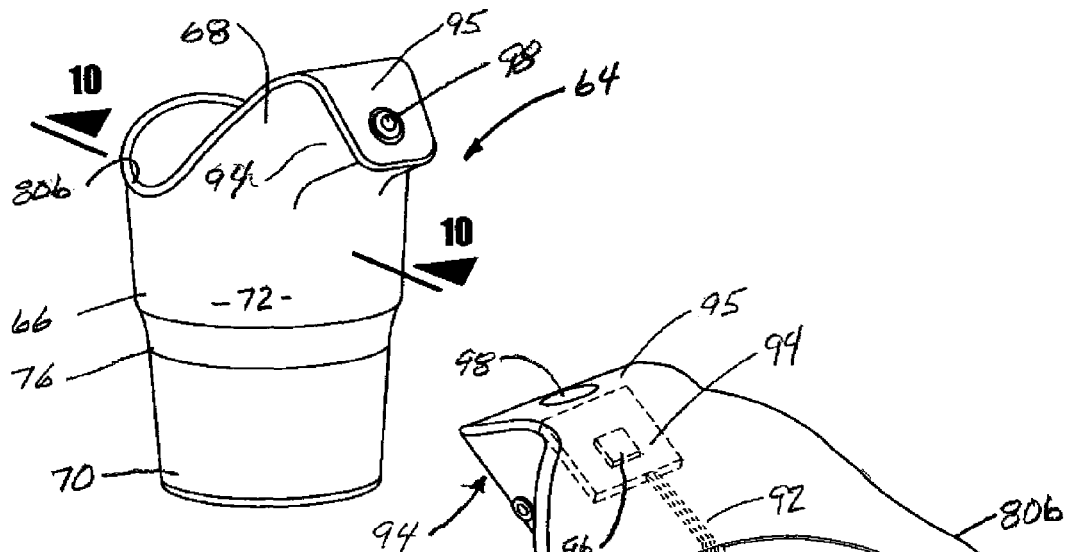
FIG. 8 is a generally perspective, front view of an alternate form of the apparatus of the invention for warming consumable liquids.
Figure 10:
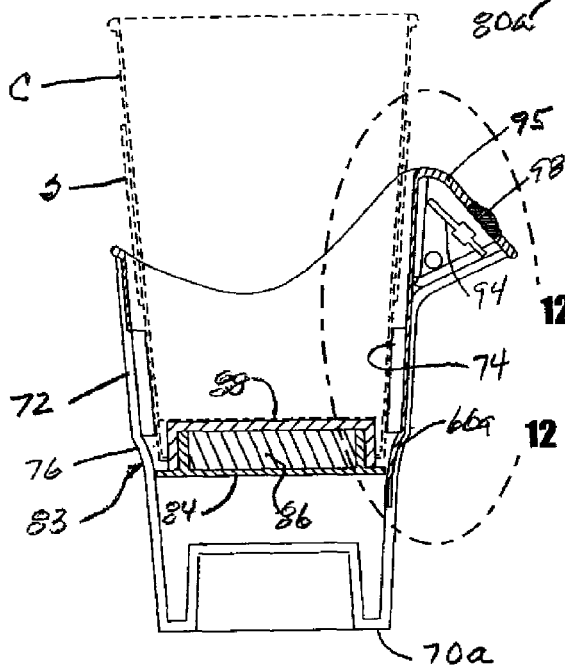
FIG. 10 is a cross-sectional view taken along lines 10-10 of FIG. 8.

Referring particularly to FIG. 7, one form of the electrical circuitry 38 is there shown. As indicated in FIG. 7, the portable liquid warmer or coffee cup warmer of the invention is designed to operate from a 12 VDC source "S", such as a cigarette lighter, or from a 120 VAC to 12 VDC adapter. For this purpose, the circuit includes a connector 42 for connecting the electrical circuit 38 to the twelve-volt power source "S".

The DC IN, or source "S" feeds to a readily commercially available metal-oxide-semiconductor field-effect transistor (MOSFET) switch 44 of a character well understood by those skilled in the art that consists of a pair of N-Channel MOSFETs in parallel as a low-side power switch. The transistor switch controls the DC power passing from the input to the heater element while a thermistor assembled in the heater assembly 28 is monitored to determine the actual temperature. The transistors are driven with a logic level signal (e.g. 3.3 Volt) to reduce system complexity. Two transistors are used in parallel to reduce power dissipation which can be more of a problem with low gate voltage drive. The MOSFET switch 44 is available from various sources, but a MOSFET switch offered for sale by Texas Instruments of Dallas, Tex. has proven satisfactory for the present purpose.

The MOSFET switch 44 communicates with a microcontroller (MCU) 46 that provides the control and measurement features necessary to operate the device. The microcontroller 46 sequences the control signals, measures the temperature via a temperature sensor 47 and provides the user interface controls for a control button 48 and three LED indicators 50, 52 and 54. A small linear low dropout (LDO) voltage regulator 56 provides the operating power for the MCU and LEDs.

In the apparatus of the present form of the invention, the MCU 46 performs two primary control functions. The first of these is the user interface control which processes button presses by the user to select the various operating modes. The second control function is the temperature measurement and heater control function. This also includes an automatic power-down feature to de-energize the electric heater after a predetermined period of time. The MCU here includes a 16-bit analog to digital converter (ADC) for measurement of the thermistor-controlled voltage (temperature).

As depicted in FIG. 1, the LED's 50, 52 and 54, each of which is covered by a lens is in the shape of a coffee bean, are readily commercially available from sources such as the Kingbright Corporation of City Of Industry, Calif. The LED's function to indicate which setting is active on the cup warmer. The LED's and control button 48 are directly interfaced to the MCU and the user interface is implemented in software which executes on the MCU in a manner well understood by those skilled in the art. In the present form of the invention, LED 50 indicates the low setting while LED's 52 and 54 indicate medium and high settings, respectively. The temperature settings can be preset at any desired levels, but here are set at 125, 140 and 155 degrees Fahrenheit respectively. Sequentially pressing the control button 48 indexes the system through four modes, namely off, low heat, medium heat and high heat.

A timer disposed internally of the MCU 46 provides a periodic measurement and control update function as well as an automatic power-off timer. MCU 46, which is of a character well understood by those skilled in the art, is available from various sources, but an MCU offered by Texas Instruments under the serial number MSP430 has proven satisfactory for the present purpose.

As previously mentioned, temperature is measured at the outside of the flexible heater using the temperature sensor 47. The microcontroller compares the measured voltage to setpoint operating levels to determine whether the device temperature is at the proper value. The temperature sensor is available from various sources, but a sensor offered by the Cantherm Company of Montreal, Canada has proven satisfactory.

As previously mentioned, controller 36 functions to de-energize the electric heater after it reaches a predetermined elevated temperature. For this purpose, a thermal fuse 60 is assembled in series with the flexible heater of the apparatus and is placed in contact with the heater. The thermal fuse 60 is designed to open the circuit and force the heater off should the temperature ever exceed about 183° F. (84° C.). In order to prevent melting of the plastic or combustion of internal parts of the device, fuse 60 cannot be reset and must be replaced should the over-temperature condition ever occur. Thermal fuses of various temperatures are readily commercially available and the optimal safety temperature is selected to match the particular design materials and safety requirements.

For additional safety, the controller circuit also includes the previously mentioned internal timer that provides an automatic shutoff feature that functions to de-energize the heater after the expiration of a predetermined time as, for example, approximately 30 minutes. The shutoff timer may be reset by simply pressing the control button to start another cycle.

In using the apparatus of the invention, the user first inserts the container "C" containing the consumable liquid, such as a tapered paper cup, into the tapered receiving chamber 24. In this regard, as previously mentioned, the tapered receiving chamber 24 accepts all standard cup sizes and performs equally well with various other cup sizes. With the device connected to a suitable 12 VDC or 120 VAC power source, the control button 48 is pushed to activate the device. This will cause the electric heater to heat to the low temperature of about 125 degrees Fahrenheit and will cause LED 50 to illuminate indicating that the low temperature setting has been selected. A second pushing of the control button 48 will cause the electric heater to heat to the medium temperature of about 140 degrees Fahrenheit and will cause LED 52 to illuminate indicating that the medium temperature setting has been selected.

A third pushing of the control button 48 will cause the electric heater to heat to the high temperature of about 155 degrees Fahrenheit and will cause LED 54 to illuminate indicating that the high temperature setting has been selected. A fourth pushing of the control button 48 will inactivate the device so that a new cycle can be started at the convenience of the user.

Following activation of the device, if the temperature rises above the programmed temperature settings (Low/Medium/High), the unit will automatically shut off and will reactivate once as the temperature reaches the specified level. Similarly, following activation of the device, the device will automatically deactivate after 30 minutes have expired. To reactivate the device, the user need only push the control button 48

Referring next to FIGS. 8 through 13B, an alternate form of the apparatus of the invention for warming consumable liquids and for maintaining the elevated temperature of the liquid is there shown and generally designated by the numeral 64. This apparatus is similar in some respects to the apparatus illustrated in FIGS. 1 through 7. However, as will be discussed in greater detail in the paragraphs which follow, the apparatus of this latest form of the invention is specially designed to permit the apparatus to be easily used with a disposable paper cup about which a heat insulating, corrugated protective sleeve has been placed. More particularly, in the design of the alternate form of the apparatus of the invention, a portion of both of the side walls of the unit has been removed to permit the disposable paper cup along with a heat protective sleeve to be easily inserted into and removed from the tapered receiving chamber of the unit.

Figure 9:
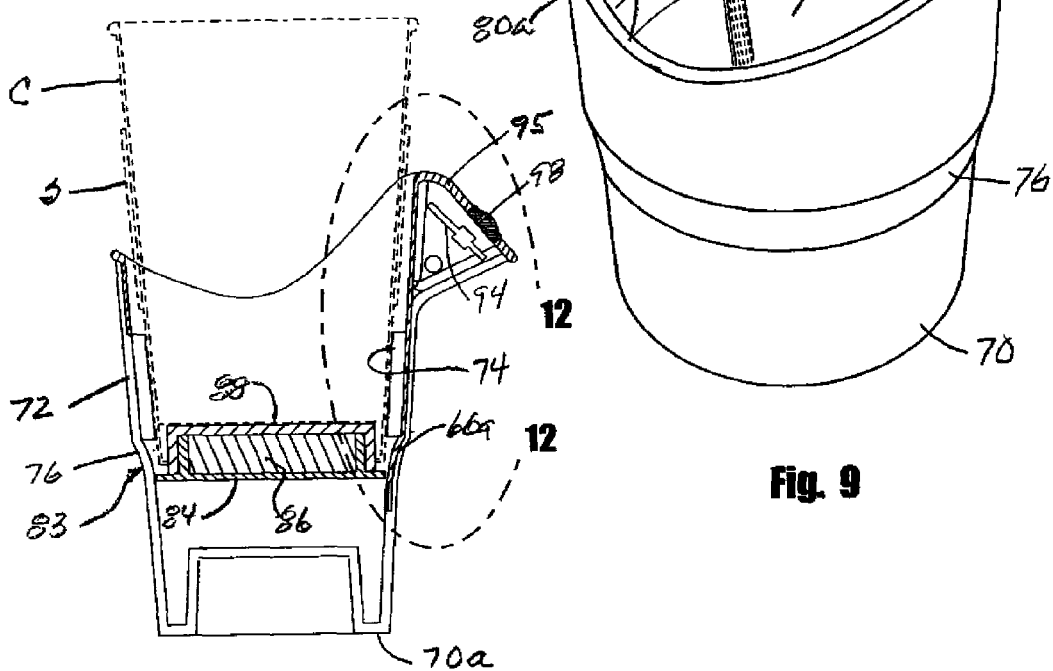
FIG. 9 is a generally perspective, rear view of the alternate form of the apparatus of the invention shown in FIG. 8.
Figure 11:
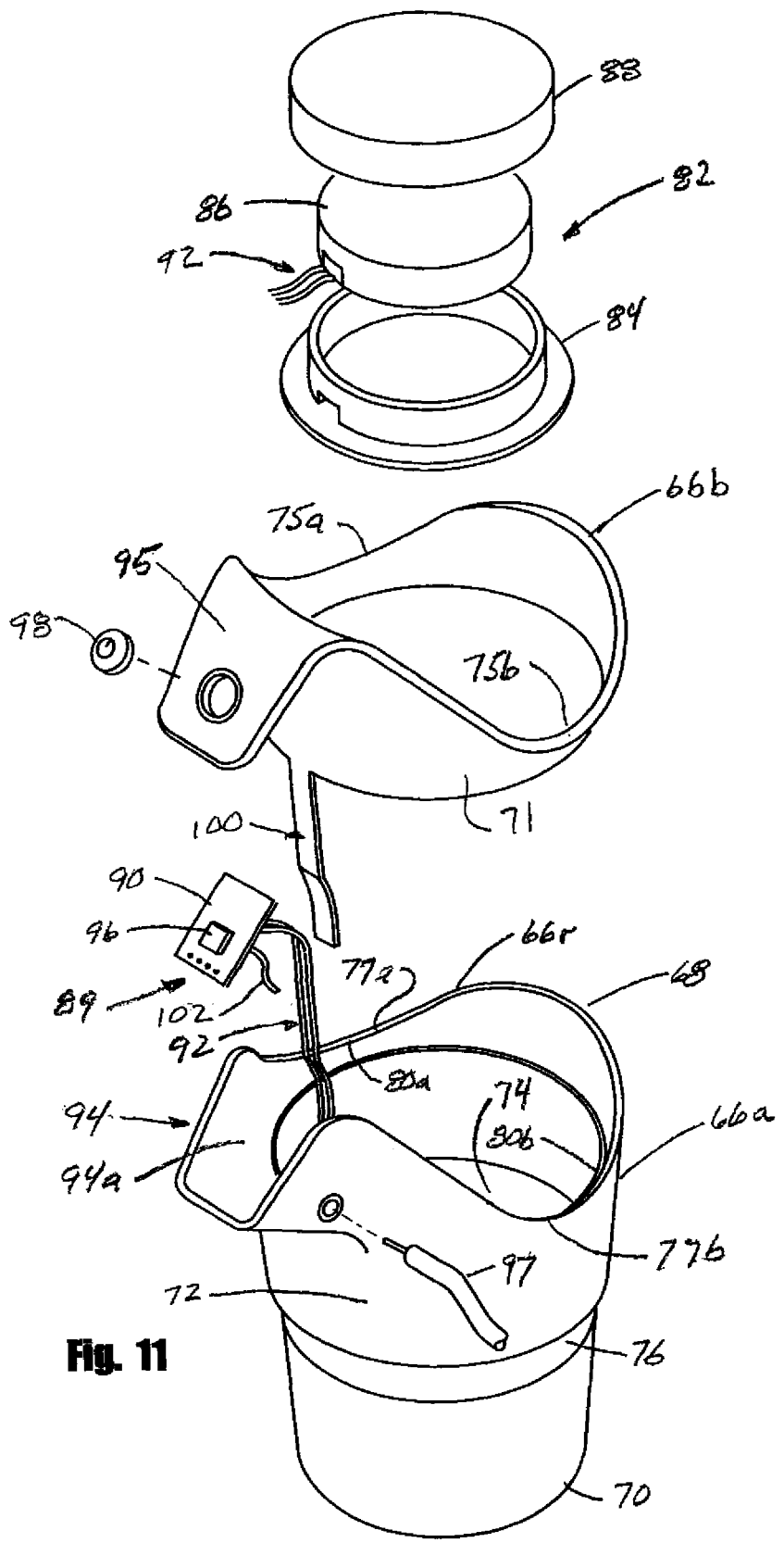
FIG. 11 is a generally perspective, exploded view of the alternate form of the apparatus of the invention.

As best seen by referring to FIGS. 9 and 11 of the drawings, this latest form of the invention comprises a somewhat differently configured, two-part housing 66 having a lower cup housing portion 66a and a tapered upper cover portion 66b. Housing portion 66a includes an upper portion 68, a lower portion 70 and a side wall 72 defining a tapered receiving chamber 74 for receiving the container "C". Disposed between upper and lower portions 68 and 70 is a tapered shoulder portion 76 that is adapted to engage a receptacle, such as a vehicle cup holder (not shown), so as to hold the apparatus in a stable, upright position. Lower portion 70 includes a generally annular shaped, planar surface 70a that permits the apparatus to rest in a stable fashion on a flat surface, such as a table, desk top and the like (See FIG. 10). As illustrated in FIG. 11 of the drawings, cover portion 66b includes a skirt portion 71 that is closely received within the cup housing 66a to form the construction shown in FIGS. 8 and 9.

As previously mentioned, an important feature of the apparatus 64 resides in the novel configuration of the sidewall that defines the tapered receiving chamber 74 that receives the container and the heat insulating, or protective sleeve "S" that surrounds the body of the container. More particularly, both the cup housing 66a and the cover 66b include oppositely disposed, downwardly curving portions 75a and 75b and 77a and 77b respectively that define oppositely disposed side openings 80a and 80b in the assembled apparatus 64 (see FIGS. 8 and 9) that permit the user to firm grasp the heat protective sleeve of the container as the container assemblage is being inserted into and removed from receiving chamber.

Figure 12:
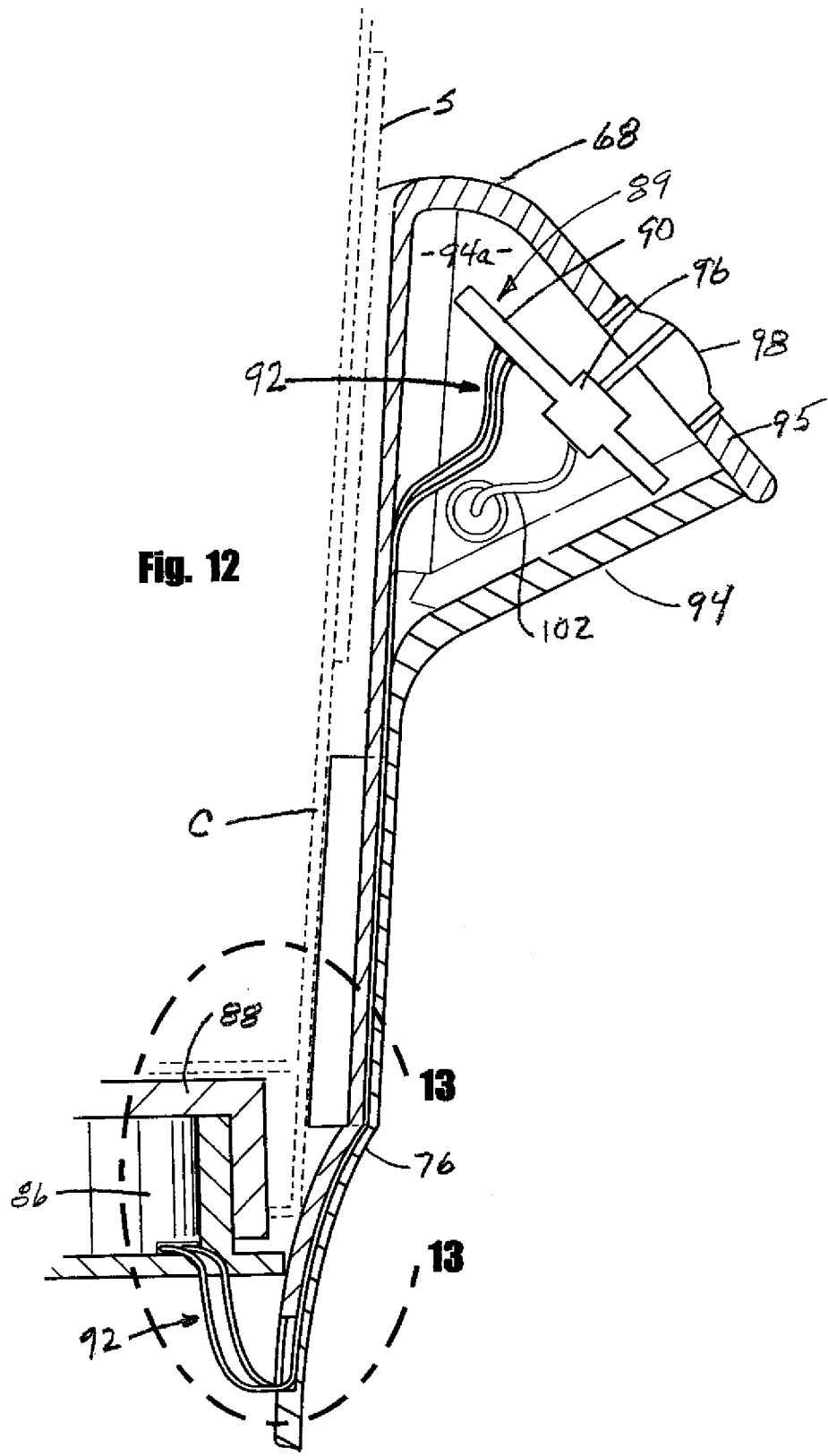
FIG. 12 is a greatly enlarged, cross-sectional view of the area designated in FIG. 10 as 12-12.

Also comprising an important feature of this latest form of the apparatus of the invention is a heater assembly 82 for heating liquids contained within the container "C" (see FIG. 11). Heater assembly 82, which is carried by the intermediate portion 83 of the cup housing 66a, is disposed in close proximity to tapered receiving chamber 74 (see FIG. 10). This important assembly here includes a silicone heater frame 84, an electric heater element 86 that is mounted within the heater frame and an aluminum heater cover 88 for covering the electric heater element and for supporting the container containing the liquid to be heated. While several types of heaters can be used in connection with the apparatus of the invention, heater assembly 82 here comprises a readily commercially available positive temperature coefficient ceramic heating element. Heating element 86 is available from several sources, including DBK USA, Inc. of Spartanberg, S.C. Forming another important feature of the apparatus of the invention is a controller assembly 89 that includes a conventional circuit board 90 that comprises an electrical circuit operably associated with the heater assembly 82 for energizing the electric heater 86 of the heater assembly. Circuit board 90, which is of the construction well understood by those skilled in the art, is interconnected with the electric heater 86 in a conventional manner by means of a pair of connector wires 92 (FIG. 12). In addition to energizing the electric heater, controller assembly 89 functions to maintain the heater cover 88 of the heater assembly at a selected elevated temperature.

As in the earlier described embodiment of the invention, the upper portion 68 of the cup housing includes a protuberance 94 that defines a chamber 94a within which the circuit board 90 of the controller assembly is mounted. As best seen in FIG. 12 of the drawings, when the cover portion 66b is mated with the cup housing 66a to form the liquid heating apparatus 64, the faceplate portion 95 of the cover portion overlaps and closes chamber 94a. Circuit board 90 includes a conventional switch 96 and is operated by an illuminated switch button 98 that is operably associated with switch 96 and is carried by a faceplate portion 95.

Cover portion 60b of the apparatus includes a downwardly extending tongue 100 (FIG. 11) that functions to hold the wires 92 in position. More particularly, as illustrated in FIGS. 13A and 13B, when the cover portion 66b of the apparatus is mated with the cup housing portion 66a, tongue 100 moves from the position shown in FIG. 13A to the mating position shown in FIG. 13B where it securely clamps the wires 92 into engagement with the inner surface of the cup housing wall.

As before, the portable liquid warmer or coffee cup warmer of the invention is designed to operate from a 12 VDC source, such as a cigarette lighter, or from a 120 VAC to 12 VDC adapter. For this purpose, the electrical circuit of the controller assembly includes a power cord connector 102 for connecting the electrical circuit to the twelve-volt power source (FIG. 11).

In using the apparatus of the invention, the user first inserts the container "C" containing the consumable liquid, such as a tapered paper cup, into the tapered receiving chamber 24. In this regard, as previously mentioned, the tapered receiving chamber 24 accepts all standard cup sizes and performs equally well with various other cup sizes. With the device connected to a suitable 12 VDC or 120 VAC power source, the control button 48 is pushed to activate the device. This will cause the electric heater to heat to the low temperature of about 125 degrees Fahrenheit and will cause LED 50 to illuminate indicating that the low temperature setting has been selected.

The design has been improved by removing a portion of both side walls of the unit and tapering the top. This allows the user to easily insert and remove the cup with a sleeve easily without having to hold the unit or having the cup or sleeve hang up on the warmer. By removing the sides in the manner shown in the enclosures, together with the tapered top rim, the user can grab the sleeve and cup at a low enough position and easily remove. This eliminates any fumbling around in retrieving the cup with sleeve, which is important when the user is driving. This unit utilizes the heat wrap design to heat the liquid, which surrounds the cup, and with these changes the wrap can be die cut or molded to fit the new shape. In addition, despite having less heat wrap to make contact with the cup, the heating performance is still sufficient for our application.

A second pushing of the control button 48 will cause the electric heater to heat to the medium temperature of about 140 degrees Fahrenheit and will cause LED 52 to illuminate indicating that the medium temperature setting has been selected.

Another object of the invention is to provide an alternate form of the apparatus of the invention as described in the preceding paragraph that is specially designed to permit the apparatus to be easily used with a disposable paper cup about which a heat insulating sleeve has been placed. More particularly, in the design of the alternate form of the apparatus of the invention, a portion of both of the side walls of the unit has been removed to permit the disposable paper cup along with a heat insulating sleeve to be easily inserted into and removed from the tapered receiving chamber of the unit.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

The invention claimed is:

1. An apparatus for warming liquids contained within a container and for maintaining the elevated temperature of the liquid, said apparatus comprising:
(a) a two-part housing having a lower cup housing portion and a tapered upper cover portion, said lower cup housing portion having a side wall defining a tapered receiving chamber and including oppositely disposed, downwardly curving portions that define oppositely disposed openings to permit grasping of the container;

(b) a heater assembly, including an electric heater, carried by said housing for heating liquids contained within the container; and (c) a controller comprising an electrical circuit operably associated with said electric heater for energizing said electric heater.

2. The apparatus as defined in claim 1 in which said lower cup housing portion includes a shoulder located between upper and lower portions of said lower cup housing portion.

3. The apparatus as defined in claim 2 in which said upper portion of said lower cup housing portion of said housing includes a protuberance within which said electrical circuit of said controller is mounted.

4. The apparatus as defined in claim 1 in which said heater assembly further comprises a heater frame for holding said electric heater and a heater cover covering said electric heater.

5. The apparatus as defined in claim 4 in which said controller functions to maintain said heater cover of said heater assembly at a selected elevated temperature.

6. The apparatus as defined in claim 4 in which said electric heater comprises a positive temperature coefficient heating element.

7. An apparatus for warming liquids contained within a container having a removable heat protective sleeve and for maintaining the elevated temperature of the liquid, said apparatus comprising:

(a) a two-part housing having a lower cup housing portion and a tapered upper cover portion, said lower cup housing portion having a side wall defining a tapered receiving chamber and including oppositely disposed, downwardly curving portions that define oppositely disposed openings that permit firm grasping of the heat protective sleeve of the container;

(b) a heater assembly carried by said housing for heating liquids contained within the container, said heater assembly comprising a heater frame, an electric heater mounted within said heater frame and a heater cover covering said electric heater; and (c) a controller comprising a printed circuit board operably associated with said electric heater for energizing said electric heater of said heater assembly.

8. The apparatus as defined in claim 7 in which said electric heater comprises a positive temperature coefficient heating element.

9. The apparatus as defined in claim 7 in which said controller functions to maintain said heater cover of said heater assembly at a selected elevated temperature.

10. The apparatus as defined in claim 7 in which said lower cup housing portion includes a shoulder located between upper and lower portions thereof.

11. The apparatus as defined in claim 7 in which said lower cup housing portion of said housing includes an inwardly extending, generally cup-shaped protuberance.

12. The apparatus as defined in claim 10 in which said upper portion of said lower cup housing portion of said housing includes an outwardly extending protuberance within which said printed circuit board of said controller is mounted.

13. The apparatus as defined in claim 12 further including an illuminated power switch mounted on said protuberance.

14. An apparatus for warming liquids contained within a container having a removable heat protective sleeve and for maintaining the elevated temperature of the liquid, said apparatus comprising:

(a) two-part housing having a lower cup housing portion and a tapered upper cover portion, said lower cup housing portion having a side wall defining a tapered receiving chamber and including oppositely disposed, downwardly curving portions that define oppositely disposed openings that permit firm grasping of the heat protective sleeve of the container;

(b) a heater assembly carried by said housing for heating liquids contained within the container, said heater assembly comprising a heater frame, a positive temperature coefficient heating element mounted within said heater frame and a heater cover covering said electric element; and (c) a controller comprising a printed circuit board operably associated with said electric heater for energizing said electric element of said heater assembly.

15. The apparatus as defined in claim 14 in which said electric element comprises a ceramic positive temperature coefficient heating element.

16. The apparatus as defined in claim 14 in which an upper portion of said lower cup housing portion has an outwardly extending protuberance within which said printed circuit board is mounted.

17. The apparatus as defined in claim 14 in which said upper cover portion includes a skirt portion that is closely received within said lower cup housing portion.

18. The apparatus as defined in claim 14 in which said lower cup housing portion includes a generally annular shaped, planar surface.

19. The apparatus as defined in claim 14 in which said lower cup housing portion includes an inwardly extending, generally cup-shaped protuberance.

* * * * *